US009082159B2

(12) United States Patent
Reisman (10) Patent No.: US 9,082,159 B2
(45) Date of Patent: Jul. 14, 2015

(54) NON-RIGID COMPOSITION OF MULTIPLE OVERLAPPING MEDICAL IMAGING VOLUMES (75) Inventor: James G. Reisman, Princeton, NJ (US)

(73) Assignee: Siemens Aktiengesellschaft, Munich (DE)

(*) Notice: Subject to any disclaimer, the term of this patent is extended or adjusted under 35 U.S.C. 154(b) by 216 days.

(21) Appl. No.: 13/817,946

(22) PCT Filed: Oct. 6, 2011

(86) PCT No.: PCT/US2011/055030
§ 371 (c)(1),
(2), (4) Date: Apr. 5, 2013

(87) PCT Pub. No.: WO2012/048070
PCT Pub. Date: Apr. 12, 2012

(65) Prior Publication Data
US 2013/0208960 A1 Aug. 15, 2013

Related U.S. Application Data (60) Provisional application No. 61/390,730, filed on Oct. 7, 2010.

(51) Int. Cl.
G06K 9/00 (2006.01)
G06T 3/00 (2006.01)
G06T 3/40 (2006.01)
G06T 7/00 (2006.01)

(52) U.S. Cl.
CPC .............. G06T 3/00 (2013.01); G06T 3/4038 (2013.01); G06T 7/0024 (2013.01)

(58) Field of Classification Search
None
See application file for complete search history.

(56) References Cited

U.S. PATENT DOCUMENTS

| 5,633,951 | A | 5/1997 | Moshfeghi | |
| 2007/0098299 | A1* | 5/2007 | Matsumoto | 382/284 |
| 2009/0096454 | A1 | 4/2009 | Reisman | |
| 2010/0061612 | A1 | 3/2010 | Reisman et al. | |
| 2010/0160764 | A1* | 6/2010 | Steinberg et al. | 600/407 |
| 2010/0239140 | A1* | 9/2010 | Ruijters et al. | 382/130 |
| 2010/0296712 | A1* | 11/2010 | Chiang et al. | 382/131 |

FOREIGN PATENT DOCUMENTS

WO  WO 2008116565 A2  10/2008

* cited by examiner

Primary Examiner — Matthew Bella
Assistant Examiner — Weiwen Yang (57) ABSTRACT A method, including: registering a new image volume with a composed image volume, wherein the new image volume and the composed image volume overlap each other in an overlap region, the composed image volume includes at least two image volumes that overlap each other, and each voxel in the composed image volume includes a weight; determining a deformation between the new image volume and the composed image volume; updating the weights of the voxels in the composed image volume that are overlapped by the new image volume; performing an alpha morphing on the overlap region using the updated weights and the deformation; obtaining a blend region of the overlap region by performing an alpha blending using results of the alpha morphing and the updated weights; and incorporating the blend region into the composed image volume to obtain a new composed image volume.

12 Claims, 6 Drawing Sheets

Prior Art

Prior Art

Prior Art

NON-RIGID COMPOSITION OF MULTIPLE OVERLAPPING MEDICAL IMAGING VOLUMES

CROSS-REFERENCE TO RELATED APPLICATION

This application claims priority under 35 U.S.C. §119 to U.S. Provisional Application No. 61/390,730, filed Oct. 7, 2010, the disclosure of which is incorporated by reference herein in its entirety.

BACKGROUND OF THE INVENTION

1. Technical Field

The present invention relates to medical image composition.

2. Discussion of the Related Art

Medical image composition is the act of joining image volumes from separate views from a medical image scanner into one consistent seamless whole volume. This is done via the method of composing (also called stitching or mosaicing).

Figure 1:
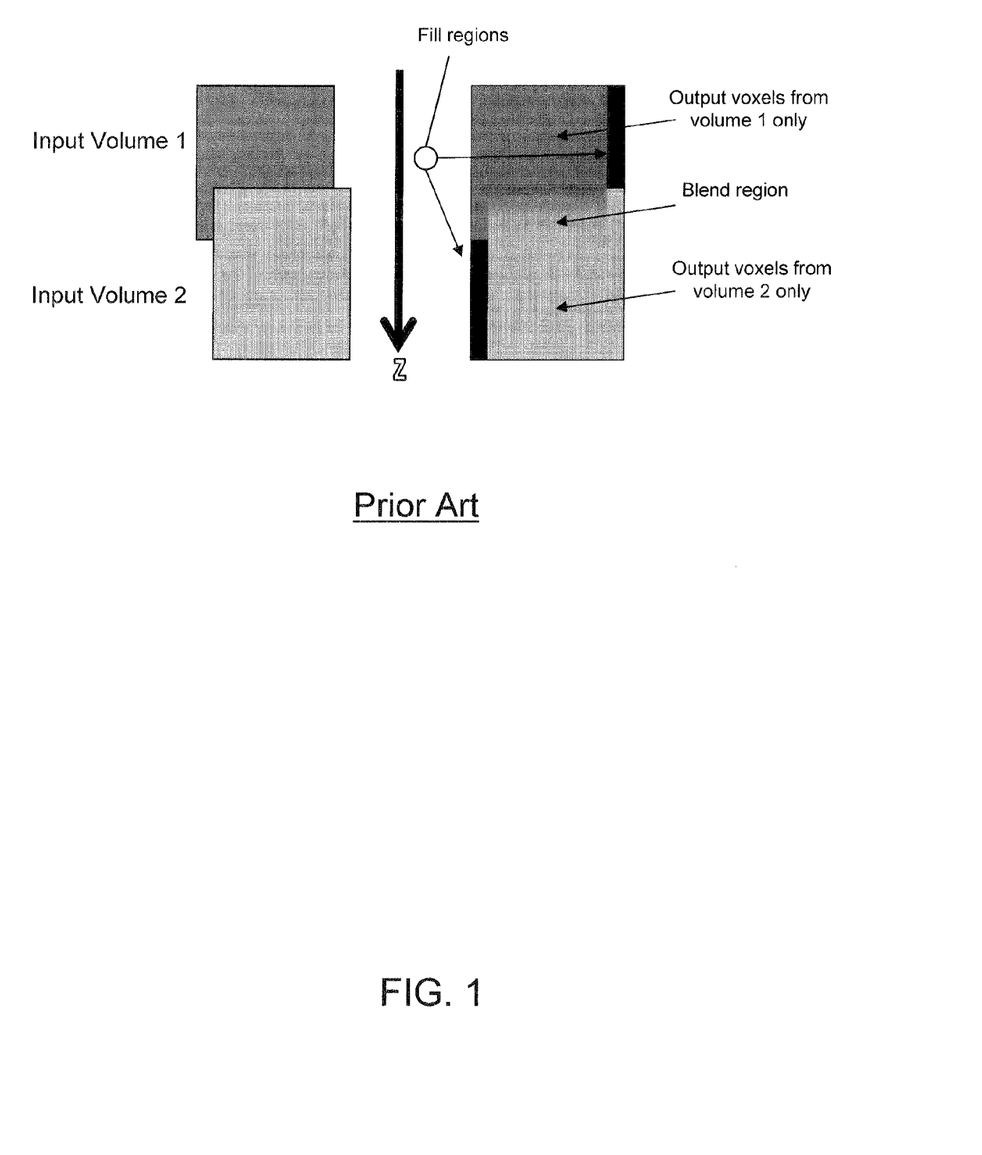
FIG. 1 illustrates a prior art stitching process.

In "stitching," an algorithm is used to fill in the voxels of the output larger volume according to the locations computed by alignment. Where only one input volume overlaps an output voxel location, data is copied directly from the input to the output. Where two or more input volumes overlap at an output voxel, program logic is used to determine how to choose between the input datapoints or blend them together. Where no input volume overlaps the output, black voxels are used to fill. FIG. 1 illustrates this concept.

More specifically, FIG. 1 is an illustration of stitching aligned volumes together by blending first and second volumes (input volumes 1 and 2) in the overlap area. For ease of illustration, only the front plane of each volume is illustrated.

The goals of blending component volumes are to limit artifacts that can occur from image volume distortion and/or patient/anatomy motion. These include: (a) limiting visible seams or creases; (b) limiting contrast variation; and (c) limiting ghosting effects due to blending.

The increase of the field strength of newer magnetic resonance imaging (MRI) machines (e.g., the Siemens Trio) provides the opportunity for improved image resolution and quality. A challenge with these systems is that the increased magnetic strength has resulted in magnifying B0 effects (e.g., a magnetic loading distortion effect). B0 effects present themselves as a localized distortion in the volume. B0 distortion can occur anywhere within the volume, but is most pronounced in the regions on the periphery of the isocenter of the volume. Much effort has been made to correct for these effects in the design of MRI installations. As an example, see J. Sled, G. Pike, Correction for B0 and B1 variations in quantitative measurements using MRI, Magnetic Resonance in Medicine, Vol. 43, No. 4, 2000, pp. 589-593.

Whole body scans of a patient can take up three to five individual volume acquisitions which are then composed together to capture a complete scan of an individual. Since B0 effects are most evident in the leading or trailing edges of a MR volume, having sufficient volume overlap and discarding the leading or trailing regions is a possible solution. However, these kinds of solutions may inevitably result in the need for more volumes, and the more volumes that are required for an individual, the more time an individual subject workflow takes, which can cut into the efficiency of a MR installation. In addition, there is no certainty where B0 effects might occur in a volume. This makes narrowing the field of view of a volume a potentially expensive and imprecise solution.

B0 effects are not the only artifacts that can interfere with successful composition. For example, patient anatomy or movement between scans may also need to be taken into account.

SUMMARY OF THE INVENTION

In an exemplary embodiment of the present invention, there is provided a method, including: registering a new image volume with a composed image volume, wherein the new image volume and the composed image volume overlap each other in an overlap region, the composed image volume includes at least two image volumes that overlap each other, and each voxel in the composed image volume includes a weight; determining a deformation between the new image volume and the composed image volume; updating the weights of the voxels in the composed image volume that are overlapped by the new image volume; performing an alpha morphing on the overlap region using the updated weights and the deformation; obtaining a blend region of the overlap region by performing an alpha blending using results of the alpha morphing and the updated weights; and incorporating the blend region into the composed image volume to obtain a new composed image volume.

The new image volume and the composed image volume include medical image volumes.

The new image volume and at least one of the image volumes included in the composed image volume each have an arbitrary orientation.

The weight of a voxel in a single image volume is based on its distance from an edge of the single image volume.

The weight of a voxel in the composed image volume, where this voxel is included in a region of the composed image volume where the at least two image volumes overlap, is equal to a sum of the weights of the corresponding voxels from the at least two image volumes.

Updating the weights of the voxels in the composed image volume that are overlapped by the new image volume includes: for each voxel of the composed image volume overlapped by the new image volume, adding the weight of the corresponding voxel from the new image volume to the weight of that voxel in the composed image volume.

The alpha morphing and the alpha blending each include an alpha variable, the alpha variable being a ratio of the weights of the voxels in the new image volume to the weights of the voxels of the composed image volume.

In an exemplary embodiment of the present invention, there is provided a computer program product, including: a non-transitory computer readable storage medium having computer readable program code embodied therewith, the computer readable program code comprising: computer readable program code configured to perform the steps of: registering a new image volume with a composed image volume, wherein the new image volume and the composed image volume overlap each other in an overlap region, the composed image volume includes at least two image volumes that overlap each other, and each voxel in the composed image volume includes a weight; determining a deformation between the new image volume and the composed image volume; updating the weights of the voxels in the composed image volume that are overlapped by the new image volume; performing an alpha morphing on the overlap region using the updated weights and the deformation; obtaining a blend region of the overlap region by performing an alpha blending using results of the alpha morphing and the updated weights; and incorporating the blend region into the composed image volume to obtain a new composed image volume.

The new image volume and the composed image volume include medical image volumes.

The new image volume and at least one of the image volumes included in the composed image volume each have an arbitrary orientation.

The weight of a voxel in a single image volume is based on its distance from an edge of the single image volume.

The weight of a voxel in the composed image volume, where this voxel is included in a region of the composed image volume where the at least two image volumes overlap, is equal to a sum of the weights of the corresponding voxels from the at least two image volumes.

Updating the weights of the voxels in the composed image volume that are overlapped by the new image volume includes: for each voxel of the composed image volume overlapped by the new image volume, adding the weight of the corresponding voxel from the new image volume to the weight of that voxel in the composed image volume.

The alpha morphing and the alpha blending each include an alpha variable, the alpha variable being a ratio of the weights of the voxels in the new image volume to the weights of the voxels of the composed image volume.

In an exemplary embodiment of the present invention, there is provided a system, including: a memory device for storing a program; a processor in communication with the memory device, the processor operative with the program to: register a new image volume with a composed image volume, wherein the new image volume and the composed image volume overlap each other in an overlap region, the composed image volume includes at least two image volumes that overlap each other, and each voxel in the composed image volume includes a weight; determine a deformation between the new image volume and the composed image volume; update the weights of the voxels in the composed image volume that are overlapped by the new image volume; perform an alpha morphing on the overlap region using the updated weights and the deformation; obtain a blend region of the overlap region by performing an alpha blending using results of the alpha morphing and the updated weights; and incorporate the blend region into the composed image volume to obtain a new composed image volume.

The new image volume and the composed image volume include medical image volumes.

The new image volume and at least one of the image volumes included in the composed image volume each have an arbitrary orientation.

The weight of a voxel in a single image volume is based on its distance from an edge of the single image volume.

The weight of a voxel in the composed image volume, where this voxel is included in a region of the composed image volume where the at least two image volumes overlap, is equal to a sum of the weights of the corresponding voxels from the at least two image volumes.

When updating the weights of the voxels in the composed image volume that are overlapped by the new image volume, the processor is operative with the program to: for each voxel of the composed image volume overlapped by the new image volume, add the weight of the corresponding voxel from the new image volume to the weight of that voxel in the composed image volume.

The alpha morphing and the alpha blending each include an alpha variable, the alpha variable being a ratio of the weights of the voxels in the new image volume to the weights of the voxels of the composed image volume.

DETAILED DESCRIPTION OF EXEMPLARY EMBODIMENTS

Disclosed herein, in accordance with an exemplary embodiment of the present invention, is a method for improving the quality of composing image volumes for multiple overlapping volumes of arbitrary orientation using deformable registration and elastic composition. Since this method is an extension of U.S. Patent Application Publication No. 2010/0061612, of which the inventor of the instant application is a co-inventor, a description of U.S. Patent Application Publication No. 2010/0061612 will now be presented. The disclosure of U.S. Patent Application Publication No. 2010/0061612 is incorporated by reference herein in its entirety.

Figure 2:
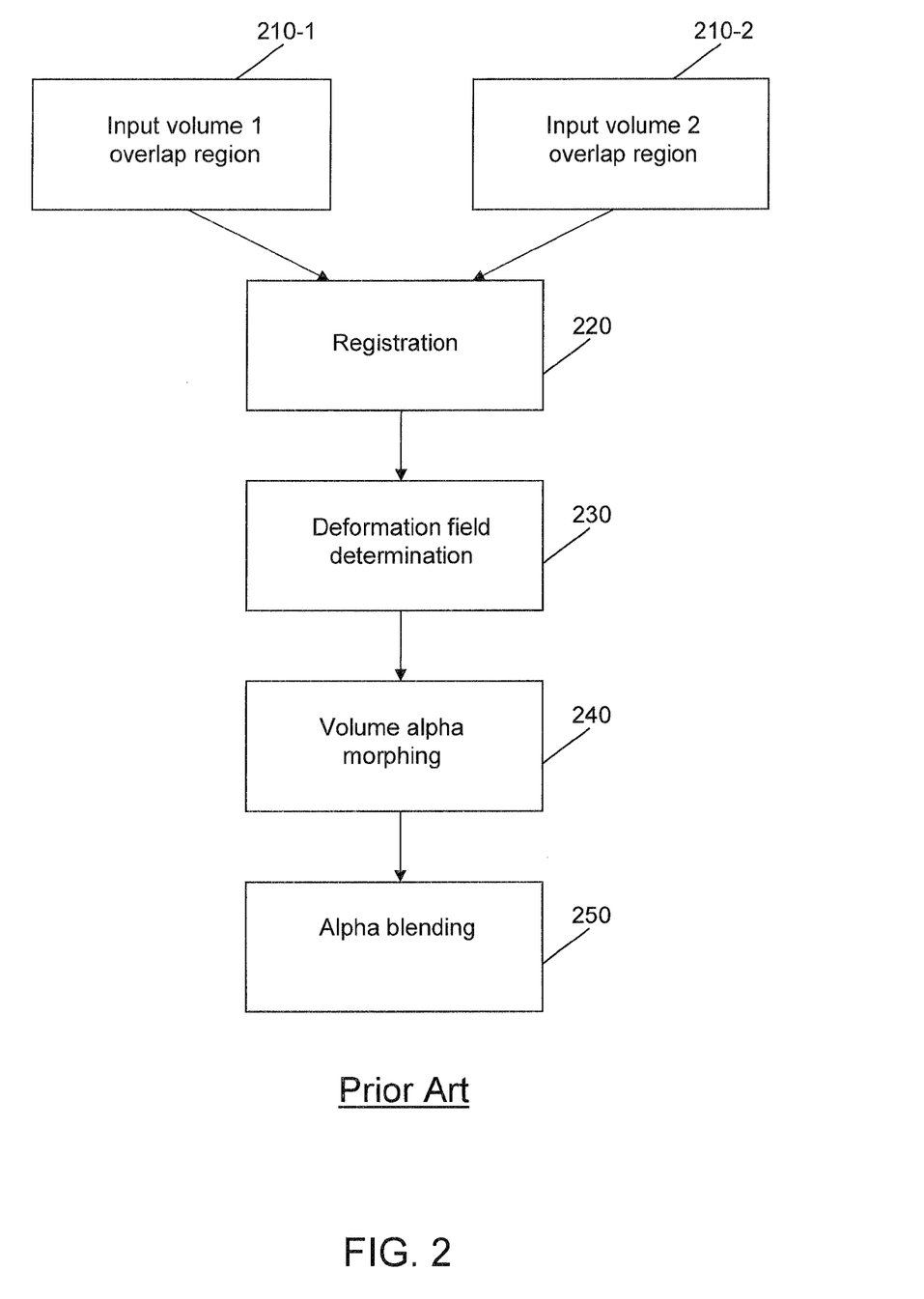
FIG. 2 is a flowchart illustrating a prior art medical image composition process.

The method of U.S. Patent Application Publication No. 2010/0061612 will be described using an example of two volume regions which overlap each other. The method will be described with references to FIGS. 2-4 of the instant application. FIG. 2 shows first steps of inputting image data for input volume 1 (210-1) and input volume 2 (210-2) in the overlap region. Offsets of the two volumes are initially determined either from the machine parameters of the scanner, or via an initial alignment stage.

The next steps involve registration (220) and deformation field determination (230). These will now be discussed.

The correspondence between overlapping areas of an image pair is established via elastic registration. The algorithm estimates a deformation that maximizes the local cross-correlation between one of the images (arbitrarily defined as reference) and the second image. In our experiments, this criterion has proved quite robust to intensity changes, signal inhomogeneities, and noise. In addition, such intensity-based approach does not require the extraction of anatomical landmarks. The deformation is represented by a smooth vector field that gives for each pixel on the reference, its corresponding location on the second image. Due to the nature of the distortions expected at the boundary of the field of view, deformations are constrained along the read-out direction. The algorithm estimates simultaneously, the deformation and its inverse, by composition of small displacements, incrementally maximizing the similarity criterion. This process, which can be seen as the numerical implementation of a transport equation, provides a large capture range.

The smoothness of the deformation is imposed by applying a low-pass filter to the vector field increments. The process is implemented in a multi-scale approach, from coarse to fine resolution, which increases the speed and provides improved convergence.

The pseudo code which is used may have the following steps:

```
Input: I₁,I₂,σ (regularization parameter)
Output: φ_k and φ̃_k (deformation and its approximated inverse),
1:   φ_0 = id
2:   while k < max_iter do
3:     compute v_k = ∇S(I₁,I₂ ∘ φ_k) (gradient of the local cross
        correlation)
4:     regularize v_k by convolution with a Gaussian window
        w_k = G_σ * v_k
5:     update φ_{k+1} = φ_k ∘ (id + τw_k)
6:     update φ̃_{k+1} = (id − τw_k) ∘ φ̃_k
7:     set k ← k + 1
8: end while
```

The method of registration and deformation field determination disclosed by U.S. Patent Application Publication No. 2010/0061612 varies from prior known methods in at least two respects.

First, the method uses constraint deformation to better model B0 distortion which occurs mainly in the readout (horizontal direction). This has caused a substantial improvement in computation time, and quality of result.

Second, the method simultaneously generates a compatible inverse deformation to assist in the alpha morphing stages.

In alpha morphing (240), the deformation field describes a one-to-one correspondence between voxels in the two overlap regions. However, to avoid seams in the bending area at the two interfaces (Volume 1 <-> Blend region, and Blend region <-> Volume 2), the effects of blending should be gradual, because instantaneous changes will cause visible discontinuities at these interfaces:

$$I_{m1} = \alpha \phi_k \circ I_1$$

$$I_{m2} = (1-\alpha) \tilde{\phi}_k \circ I_2$$

where $I_{m1}$ represents the first intermediate image volume result, $I_{m2}$ represents the second intermediate image volume result, α is a parameter with a range [0.0,1.0] which linearly increases from the top to the bottom of the blend region, $\phi_k$ represents the deformation field mapping the calculated non-rigid displacement of $I_1$ to $I_2$, $\tilde{\phi}_k$ represents the calculated non-rigid displacement of $I_2$ to $I_1$, $I_1$ represents the top overlapping image volume, and $I_2$ represents the bottom overlapping image volume. The operator "∘" represents the displacement of the elements of an image field by the matrix represented in the deformation field (in voxels).

Alpha blending (250) is a technique of combining two images (or volumes) by varying relative contributions over a blend region. This is used to finally combine the resultants from alpha morphing to create the final elastic blend region. $I_{blend}$ is calculated using:

$$I_{blend} = (1-\alpha)I_{m1} + \alpha I_{m2}$$

where α is a parameter with a range [0.0,1.0] which linearly increases from the top to the bottom of the blend region, $I_{blend}$ represents the composed overlap region, $I_{m1}$ represents the first intermediate image volume result, and $I_{m2}$ represents the second intermediate image volume result.

The method of U.S. Patent Application Publication No. 2010/0061612 has been shown to result in significant improvement in the presence of many kinds of distortions and motion, not just B0 effects.

Two case examples were performed. The first example case is shown in FIG. 3 and the second example case is shown in FIG. 4.

Figure 3:
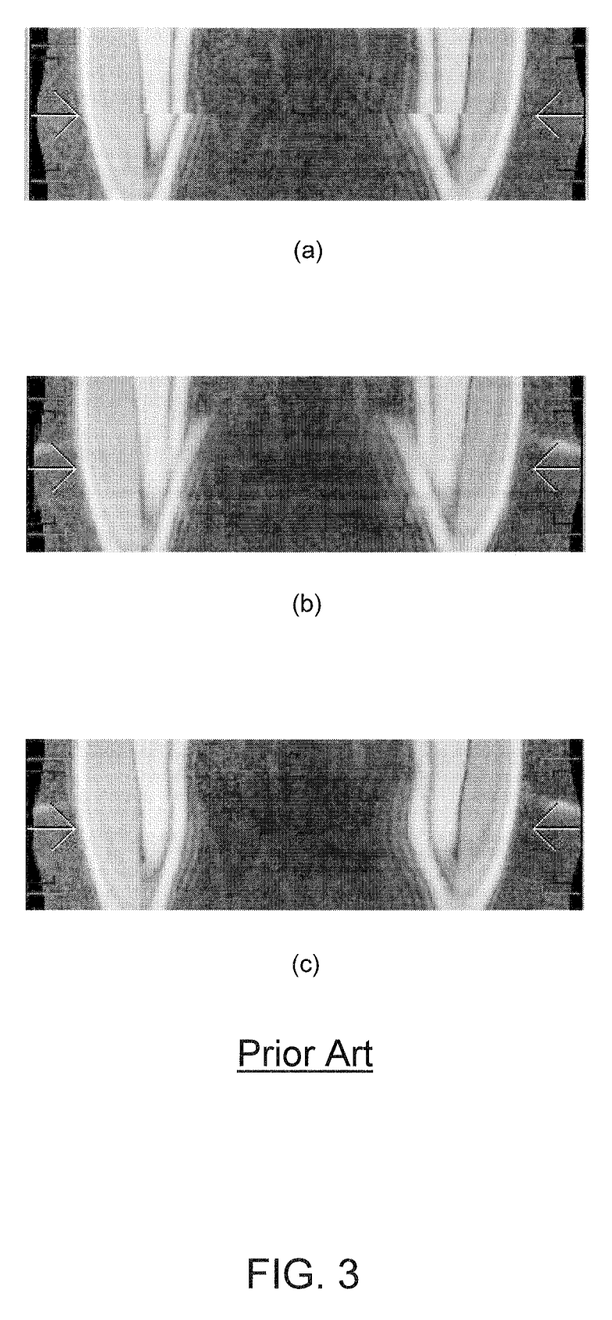
FIG. 3 includes several images illustrating the prior art process of FIG. 2, in an example case.
Figure 4:
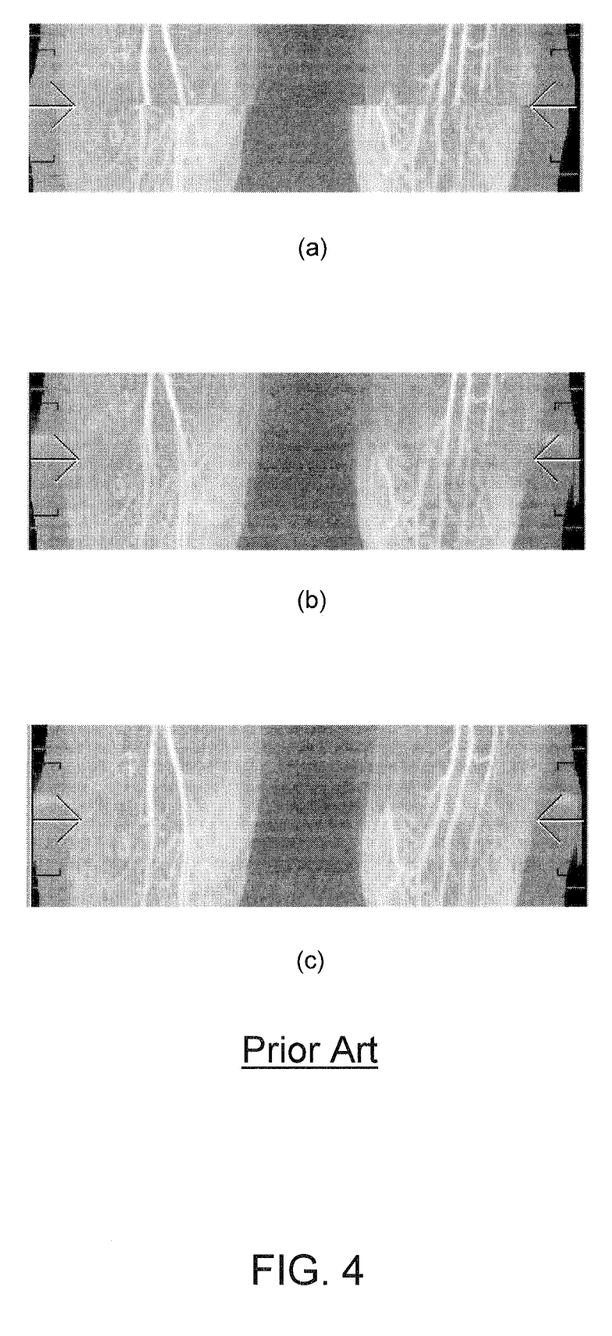
FIG. 4 includes several images illustrating the prior art process of FIG. 2, in another example case.

FIG. 3 shows results of using the method of U.S. Patent Application Publication No. 2010/0061612 in the first case. In this case, areas with B0 effects were mosaiced. The seam between two volumes suffered form mild distortions due to B0.

Image (a) in FIG. 3 shows an original overlap region with no blending. The horizontal midpoint outline can be seen by the side arrows.

Image (b) in FIG. 3 shows an image overlap region with alpha-blending only. The ghosting effects can be seen at the midpoint cutline between the side arrows.

Image (c) in FIG. 3 shows an image overlap region with alpha-morphing and alpha-blending. The region between the side arrows appears to be free of artifacts and anomalies.

Images (a-c) of FIG. 4 show images like that of FIG. 3, but for a second case example (i.e., mosaicing a subtracted angio image with dislocations). Similar results were obtained in the alpha-blending only (image (b) of FIG. 4), and in the alpha-morphing and alpha-blending (image (c) of FIG. 4).

Now that the description of U.S. Patent Application Publication No. 2010/0061612 is complete, the method according to an exemplary embodiment of the present invention will now be described.

In MR composition and for other modalities (e.g., computed tomography (CT), Ultrasound, Radiography and positron emission tomography (PET)), volumes can be acquired at an arbitrary orientation and areas of multiple volume acquisition can overlap the same anatomy. The method of U.S. Patent Application Publication No. 2010/0061612 only applies to two aligned volumes.

The method according to an exemplary embodiment of the present invention extends upon the method of U.S. Patent Application Publication No. 2010/0061612 for the multivolume, arbitrary orientation case.

Figure 5:
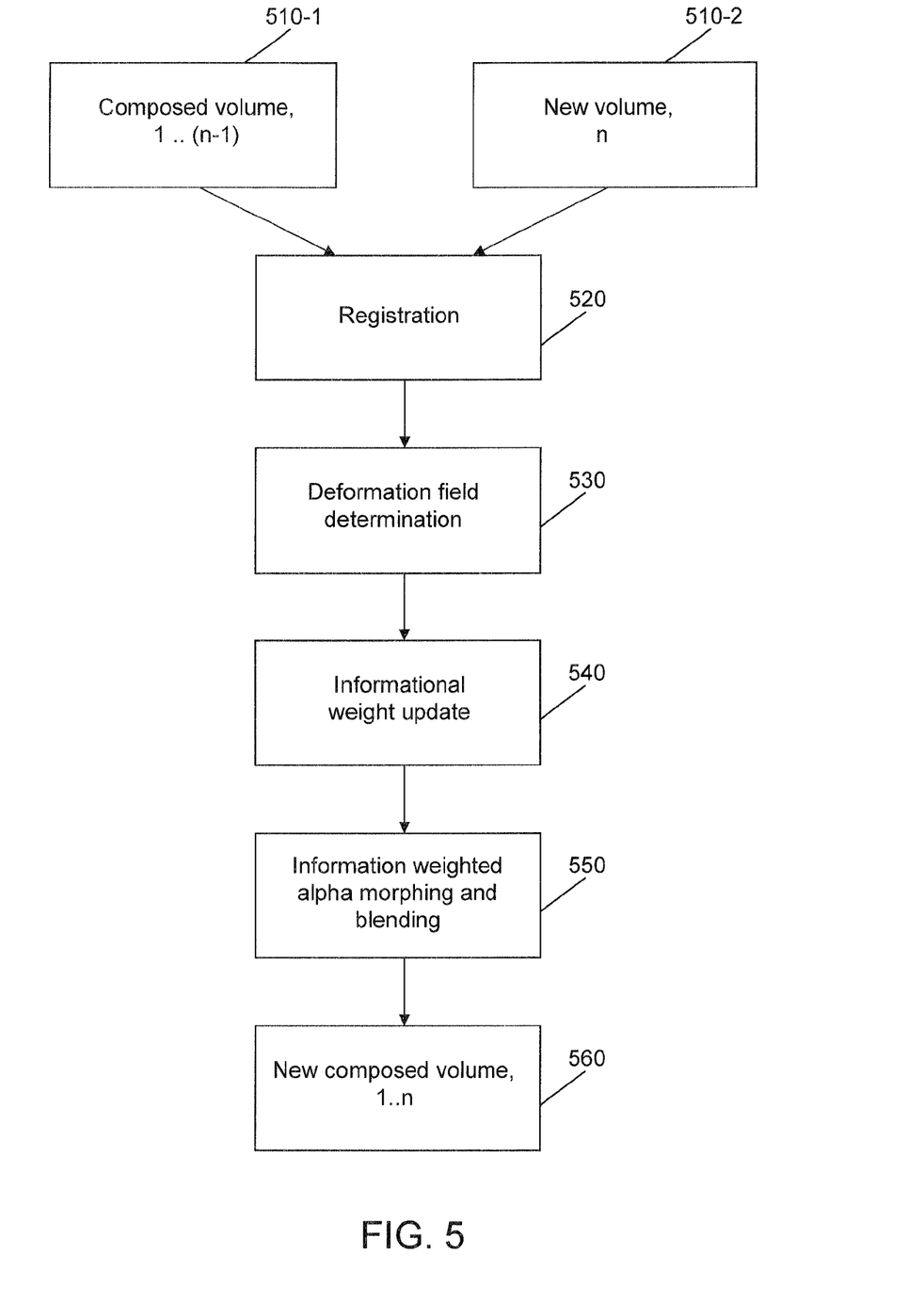
FIG. 5 is a flowchart illustrating a method according to an exemplary embodiment of the present invention.

The flowchart of the method according to an exemplary embodiment of the present invention is shown in FIG. 5.

The method shown in FIG. 5 differs from that of U.S. Patent Application Publication No. 2010/0061612 in at least the following respects.

First, composition is an iterative process where a new volume stage acquisition updates an existing composed volume (consisting of the acquisitions from previous stages).

Second, every voxel in the composed image is provided an informational weight. This is a variable (described below) which accumulates the amount of information that supports a given voxel in the composed volume.

For example, a new volume that overlaps the same portion of anatomy as three other volumes, should have less contribution to the new composed image compared to one which only one other volume overlaps. Likewise, the edge of a component volume should have less contribution than the center. This characteristic is used to remove boundary effects (e.g., image seam artifacts).

The information weight is used to determine the alpha parameter used in alpha blending and alpha morphing.

As shown in FIG. 5, a composed image volume (510-1) and a new image volume (510-2) are input. The new image volume and the composed image volume overlap and may each have an arbitrary orientation.

The new image volume may be one of the image volumes received in (210-1 or 210-2) of FIG. 2. For example, the new image volume may be an image volume that represents part of a person's anatomy. The image volume may have been acquired using MR, CT, Ultrasound, Radiography or PET modalities, for example. However, the present invention is not limited thereto, nor is it limited to anatomical images. For example, any non-anatomical thing imaged in three-dimensions may be used as input in accordance with an exemplary embodiment of the present invention.

The composed image volume is different from the new image volume in that the composed image volume includes at least two image volumes that overlap each other. Further, each voxel in the composed image volume includes an informational weight.

The informational weight of a voxel in a single image volume is based on its distance from an edge of the single image volume. This distance can be Euclidean, Manhattan, or some other distance metric. The informational weight is monotonically increasing for voxels further inside the single image volume. The informational weight is zero for all points outside the edge.

The informational weight the weight of a voxel in the composed image volume, where this voxel is included in a region of the composed image volume where the at least two image volumes overlap, is equal to a sum of the informational weights of the corresponding voxels from the at least two image volumes (making up the composed image volume). In other words, the informational weight of a voxel of the composed image volume is equal to the sum of the informational weights of the component voxels from all contributing stages. When a new volume stage (e.g., the new image volume 510-2) is added to the existing composed image volume (e.g., the composed image volume 510-1), the informational weight of the composed image volume's voxels is updated with the informational weight of the new volume stage.

In response to the receipt of the composed image volume (510-1) and the new image volume (510-2), the new image volume and the composed image volume are registered (520). The composed image volume and the new image volume may be registered using a rigid registration. This registration process may be that same as that described above for 220 of FIG. 2.

A deformation between the new image volume and the composed image volume is determined (530). This deformation may be determined using an elastic registration algorithm. This deformation determination process may be that same as that described above for 230 of FIG. 2.

The informational weights of the voxels in the composed image volume that are overlapped by the new image volume are updated (540). In this case, for each voxel of the composed image volume overlapped by the new image volume, the weight of the corresponding voxel from the new image volume is added to the weight of that voxel in the composed image volume.

An alpha morphing is performed on the overlap region using the updated weights and the deformation, and a blend region of the overlap region is obtained by performing an alpha blending using results of the alpha morphing and the updated weights (550). The alpha morphing and alpha blending are similar to U.S. Patent Application Publication No. 2010/0061612, except for the following.

In U.S. Patent Application Publication No. 2010/0061612, alpha ($\alpha$) from the above three equations, was defined as a linearly increasing value from the top to the bottom of the blend region. However, this characterization is only suitable when considering two volumes that are vertically aligned. For the method of FIG. 5, alpha ($\alpha$) is the ratio of the informational weights of the voxels in the new image volume to the informational weights of the voxels of the composed image volume. Therefore, by design, alpha ($\alpha$) will range from [0 . . . 1].

The blend region is incorporated into the composed image volume to obtain a new composed image volume (560). This is done via standard image processing techniques.

When only two aligned volumes are composed together, the method according to an exemplary embodiment of the present invention is essentially the same as the method disclosed by U.S. Patent Application Publication No. 2010/0061612. In this case, the informational weight acts like a standard alpha blending. However, when there is overlap of multiple volumes, the method according to an exemplary embodiment of the present invention successfully negotiates the degree of effect of warping and voxel intensity on the updated composed volume, by taking into account the number and location of previous volumes supporting the composed volume's voxels.

It is to be understood that when no composed image volume is input in the method of FIG. 5, but instead, several new image volumes are input, these image volumes do not have informational weights. Rather, the informational weights are calculated during the composing process (i.e., the combining of the several new image volumes together). In this case, the corresponding image voxels are given equal weight.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
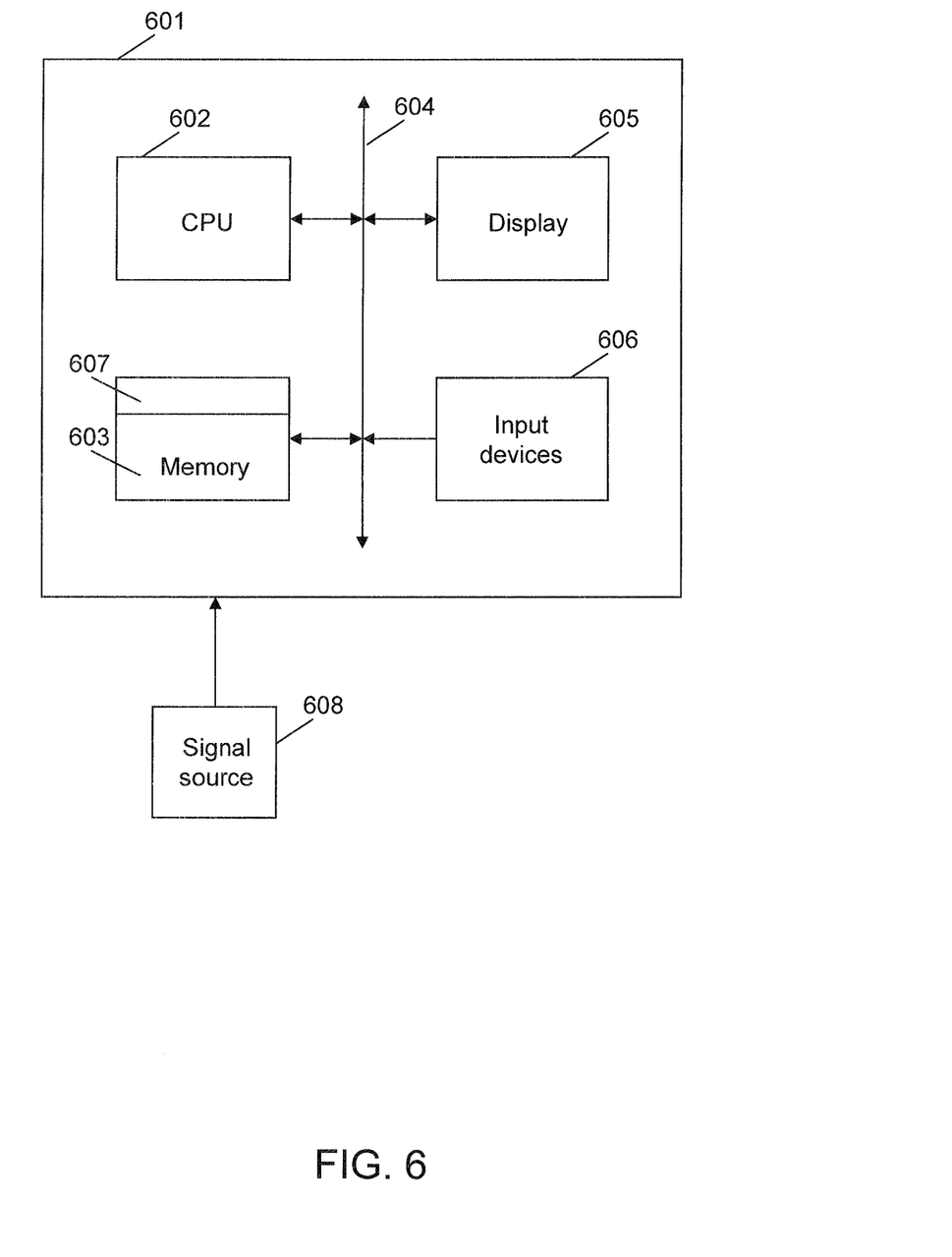
FIG. 6 illustrates a system in which an exemplary embodiment of the present invention may be implemented.

Referring now to FIG. 6, according to an exemplary embodiment of the present invention, a computer system 601 can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include RAM, ROM, disk drive, tape drive, etc., or a combination thereof. Exemplary embodiments of present invention may be implemented as a routine 607 stored in memory 603 (e.g., a non-transitory computer-readable storage medium) and executed by the CPU 602 to process the signal from a signal source 608. As such, the computer system 601 is a general-purpose computer system that becomes a specific purpose computer system when executing the routine 607 of the present invention.

The computer system 601 also includes an operating system and micro-instruction code. The various processes and functions described herein may either be part of the micro-instruction code or part of the application program (or a combination thereof) which is executed via the operating system. In addition, various other peripheral devices may be connected to the computer system 601 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method, comprising:
registering a new image volume with a composed image volume, wherein the new image volume and the composed image volume overlap each other in an overlap region, the composed image volume includes at least two image volumes that overlap each other, and each voxel in the composed image volume includes a weight;
determining a deformation between the new image volume and the composed image volume;
updating the weights of the voxels in the composed image volume that are overlapped by the new image volume;

performing an alpha morphing on the overlap region using the updated weights and the deformation;

obtaining a blend region of the overlap region by performing an alpha blending using results of the alpha morphing and the updated weights; and incorporating the blend region into the composed image volume to obtain a new composed image volume, wherein the weight of a voxel in a single image volume is based on its distance from an edge of the single image volume, wherein the weight of a voxel in the composed image volume, where this voxel is included in a region of the composed image volume where the at least two image volumes overlap, is equal to a sum of the weights of the corresponding voxels from the at least two image volumes, wherein updating the weights of the voxels in the composed image volume that are overlapped by the new image volume comprises: for each voxel of the composed image volume overlapped by the new image volume, adding the weight of the corresponding voxel from the new image volume to the weight of that voxel in the composed image volume.

2. The method of claim 1, wherein the new image volume and the composed image volume include medical image volumes.

3. The method of claim 1, wherein the new image volume and at least one of the image volumes included in the composed image volume each have an arbitrary orientation.

4. The method of claim 1, wherein the alpha morphing and the alpha blending each include an alpha variable, the alpha variable being a ratio of the weights of the voxels in the new image volume to the weights of the voxels of the composed image volume.

5. A computer program product, comprising:

a non-transitory computer readable storage medium having computer readable program code embodied therewith, the computer readable program code comprising:

computer readable program code configured to perform the steps of:

registering a new image volume with a composed image volume, wherein the new image volume and the composed image volume overlap each other in an overlap region, the composed image volume includes at least two image volumes that overlap each other, and each voxel in the composed image volume includes a weight;

determining a deformation between the new image volume and the composed image volume;

updating the weights of the voxels in the composed image volume that are overlapped by the new image volume;

performing an alpha morphing on the overlap region using the updated weights and the deformation;

obtaining a blend region of the overlap region by performing an alpha blending using results of the alpha morphing and the updated weights; and incorporating the blend region into the composed image volume to obtain a new composed image volume, wherein the weight of a voxel in a single image volume is based on its distance from an edge of the single image volume, wherein the weight of a voxel in the composed image volume, where this voxel is included in a region of the composed image volume where the at least two image volumes overlap, is equal to a sum of the weights of the corresponding voxels from the at least two image volumes, wherein updating the weights of the voxels in the composed image volume that are overlapped by the new image volume comprises: for each voxel of the composed image volume overlapped by the new image volume, adding the weight of the corresponding voxel from the new image volume to the weight of that voxel in the composed image volume.

6. The computer program product of claim 5, wherein the new image volume and the composed image volume include medical image volumes.

7. The computer program product of claim 5, wherein the new image volume and at least one of the image volumes included in the composed image volume each have an arbitrary orientation.

8. The computer program product of claim 5, wherein the alpha morphing and the alpha blending each include an alpha variable, the alpha variable being a ratio of the weights of the voxels in the new image volume to the weights of the voxels of the composed image volume.

9. A system, comprising:

a memory device for storing a program;

a processor in communication with the memory device, the processor operative with the program to:

register a new image volume with a composed image volume, wherein the new image volume and the composed image volume overlap each other in an overlap region, the composed image volume includes at least two image volumes that overlap each other, and each voxel in the composed image volume includes a weight;

determine a deformation between the new image volume and the composed image volume;

update the weights of the voxels in the composed image volume that are overlapped by the new image volume;

perform an alpha morphing on the overlap region using the updated weights and the deformation;

obtain a blend region of the overlap region by performing an alpha blending using results of the alpha morphing and the updated weights; and incorporate the blend region into the composed image volume to obtain a new composed image volume, wherein the weight of a voxel in a single image volume is based on its distance from an edge of the single image volume, wherein the weight of a voxel in the composed image volume, where this voxel is included in a region of the composed image volume where the at least two image volumes overlap, is equal to a sum of the weights of the corresponding voxels from the at least two image volumes, wherein when updating the weights of the voxels in the composed image volume that are overlapped by the new image volume, the processor is operative with the program to: for each voxel of the composed image volume overlapped by the new image volume, add the weight of the corresponding voxel from the new image volume to the weight of that voxel in the composed image volume.

10. The system of claim 9, wherein the new image volume and the composed image volume include medical image volumes.

11. The system of claim 9, wherein the new image volume and at least one of the image volumes included in the composed image volume each have an arbitrary orientation.

12. The system of claim 9, wherein the alpha morphing and the alpha blending each include an alpha variable, the alpha variable being a ratio of the weights of the voxels in the new image volume to the weights of the voxels of the composed image volume.

* * * * *